Patented Nov. 20, 1951

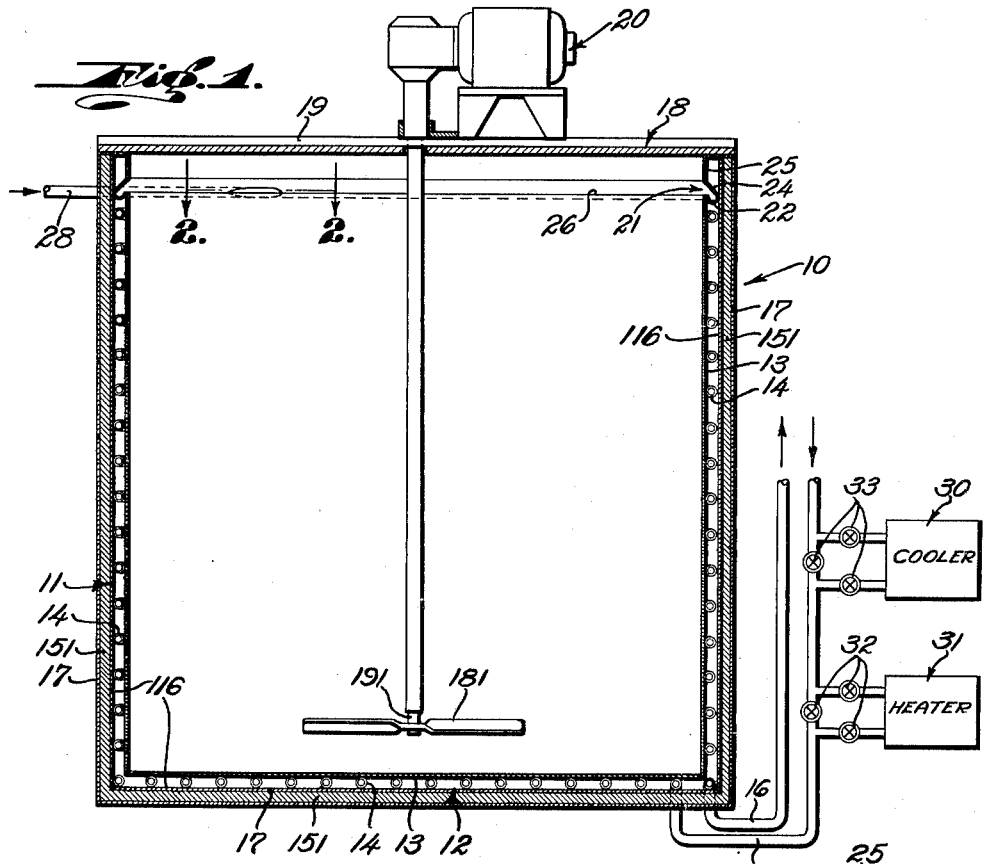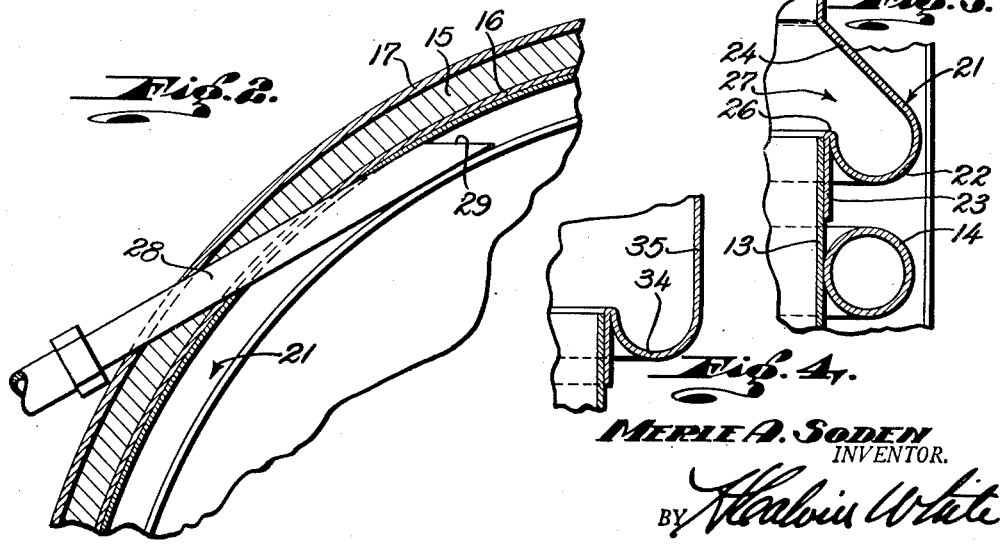

2,576,050

UNITED STATES PATENT OFFICE 2,576,050

MILK TEMPERATURE CONDITIONING VESSEL

Merle A. Soden, Anaheim, Calif.

Application February 24, 1948, Serial No. 10,512

7 Claims. (Cl. 257—190)

This invention has to do with improvements in milk storage vessels, particularly of the type comprising a tank or other vessel equipped for either or both cooling and heating a relatively large quantity of milk, so that the vessel may serve the several purposes of a cooler, heat pasteurizer and storage capacity.

The present type of vessel is one whose uses are increasing by reason of the capacity of the vessel for serving the stated purposes to the elimination of plural vessels and transfers of the milk. Structurally the vessel comprises a tank, the walls of which are equipped, as by the accommodation of circulation pipes, for cooling the milk put into the vessel. In accordance with the invention it is contemplated that the tank walls may also be heated so that the same unit may also be used as a pasteurizing vessel.

One of my major objects relates to the maintenance of an extended surface filming contact of the milk with the vessel wall as the milk is introduced to the vessel. Heretofore the conventional practice has been to flow the milk substantially directly into the bottom of the vessel, and to rely upon mechanical agitation to displace the milk in heat transferring contact with the wall surface of the vessel. This practice has been found relatively inefficient in a number of respects, including heat transfer rate limitations and the tendency for mechanical agitation to produce excessive foaming of the milk.

Pursuant to the invention, I depart from the usual practices by causing the milk entering the vessel to flow downwardly in its inner surface in a circularly distributed film, the heat of which is rapidly transferred to the cooled or refrigerated wall surface so that the major cooling of the milk may be caused to occur during its flow down along the vessel wall. In addition to greater heat transfer efficiency, such distribution and simultaneous cooling of the in-flowing milk is found to greatly suppress its normal foaming tendencies. Accordingly, any mechanical agitation of the milk collecting in the lower portion of the vessel will be productive of little and unobjectionable foaming.

In accordance with the invention I provide at the top portion of the vessel an annular trough serving to distribute the in-flowing milk about the full circumference of the vessel wall, and to permit the milk to overflow uniformly and at a rate such that it will flow downwardly over the vessel surface in a thin, uniformly distributed film. Of particular practical importance is the provision of a distributing trough form and arrangement permitting it to be easily and thoroughly cleansed, to complete elimination of any residue.

As previously indicated, the invention further departs from the conventional arrangements, by providing, if desired, for heating as well as cooling heat transferrence between the milk and the vessel walls. It is contemplated that the same vessel coils may be selectively supplied with cooling or heating fluid, all as will hereinafter appear.

The invention has various additional features and objects such as certain preferred distributing trough forms and associations with the vessel wall, and provision for tangential delivery of the milk into the trough. All these, however, will be understood most readily and to better advantage from the following detailed description of certain typical embodiments of the invention as shown by the accompanying drawing, in which:

Fig. 1 is a view showing the vessel in vertical section, in association with cooling and heating fluid supply lines;

Fig. 2 is a fragmentary enlarged section on line 2—2 of Fig. 1;

Fig. 3 is a fragmentary enlargement showing the milk distributing trough; and

Fig. 4 is a view similar to Fig. 3 illustrating a variational form of trough.

The vessel 10 is shown to have cylindrical formation, of sufficient size or capacity to contain a substantially large quantity of milk for temperature conditioning and storage. It is contemplated that the walls of the vessel shall be heat insulated and equipped in a suitable manner for the circulation of heat exchange fluid. Preferably the side 11 and bottom 12 walls of the vessel are composed of a non-corrosive lining 13, for example of stainless steel, at the outside of which are accommodated pipe coils 14, fluid circulation to and from which occurs through the connected lines 15 and 16. The vessel is heat insulated by a layer of appropriate insulating material 151 placed between metal or other sheets 116 and 17. The top of the vessel may be closed as by cover sections 18 at opposite sides of a transverse beam 19 extending diametrically across the vessel. During or after accumulation of the body of milk in the vessel, the milk may be suitably agitated to maintain a condition of flow along the heat transfer surfaces as well as to give renewed top surface exposure of the milk, as by agitator 181 carried on shaft 191 driven by the motor and reduction gear unit 29 mounted on beam 19.

A circular distributing trough 21 is so formed and accommodated in the top portion of the vessel as to distribute and film the milk uniformly over the surface of the liner 13. Referring to Fig. 3, the trough 21 preferably is positioned to directly overlie the coils 14, and may be made of sheet metal 22 secured at 23 to the liner 13, the upper wall of the trough extending inwardly at 24 and then upwardly at 25 to be joined to the outer shell structure of the vessel. The trough thus has a horizontal overflow edge 26 above which the interior of the trough is openly accessible through the gap 27 for complete cleansing and removal of all milk or other residues.

The milk is introduced to the trough, as shown in Fig. 2, through a tangentially positioned inlet pipe 28 extending through the wall of the vessel and terminating in the trough. The discharge end of the pipe preferably has an angular shape as indicated at 29, for the purpose of directing the milk outwardly against the wall of the trough, thus promoting a flow condition conducive to uniform distribution of the milk about the full circular extent of the trough.

Ordinarily the milk is to be initially cooled when put into the vessel, and it is with reference to effecting most efficient cooling of the milk while it is flowing into the vessel, that the invention has one of its major objectives. It will be understood that any appropriate coolant or refrigerating fluid may be supplied to the coil 14, as by circulation of the fluid in lines 15 and 16 through a cooling or refrigerating unit 30.

Upon entering and filling the trough 21 throughout its circular extent, the milk overflows the edge 26 and passes downwardly over the surface of the cooled liner 13 in a condition of thinly filmed and uniformly distributed flow, with the result that the consequent heat transfer rate produces rapid and wide range cooling of the milk before it reaches the bottom of the vessel, or the body of milk accumulated therein. The milk thus reaches the lower portion of the vessel after having been pre-cooled to an extent presenting the dual advantages of minimizing any further required cooling, and markedly reducing the normal tendency of the milk to foam when kept in a state of agitation by the mixer 181. In fact all foaming problems are effectively eliminated.

Should it be desired subsequently to heat the milk in this same vessel, as for purposes of pasteurization, provision may be made for circulating a heating fluid instead of a coolant, through the coils 14. For this purpose, line 15 may connect with a heater 31 through which a heat transfer fluid may be circulated by proper setting of the valves 32, the cooler valves 33 of course being set so that the fluid circuit by-passes the cooler.

Fig. 4 illustrates a variational form of distributing trough essentially similar to the type described except that its interior has direct downward accessibility from the top of the vessel. Here the trough forming metal 34 is shaped to extend vertically at 35 and at the outside of the trough, so that its interior is more directly accessible for cleansing.

It is to be understood that the drawing is intended to be illustrative of the invention's certain typical forms, and that various changes and modifications may be made without departure from the invention in its intended spirit and scope.

I claim:

1. A milk temperature conditioning vessel having an upwardly extending circular cross section side wall, means for passing fluid in heat transferring relation with said wall, a substantially circularly extending trough at the top of said vessel and from which milk overflows and is filmed onto the full circular extent of said wall for downward flow in heat transferring relation therewith above a body of the milk collecting in the bottom of the vessel, and an inlet positioned to deliver milk tangentially into the trough.

2. A milk temperature conditioning vessel having an upwardly extending circular cross section side wall comprising a smooth inside sheet metal liner, means at the outside of said liner for passing cooling fluid in heat transferring relation therewith, a substantially annular trough at the top of the vessel and from which milk overflows and is filmed onto the full circular extent of said liner for downward flow in heat transferring relation therewith above a body of the milk collecting in the bottom of the vessel, an inlet positioned to deliver milk tangentially into the trough, the interior of the trough being openly accessible from the inside to permit thorough cleaning, and means for agitating said body of milk.

3. A milk temperature conditioning vessel having an upwardly extending circular cross section side wall, means for passing fluid in heat transferring relation with said wall, a substantially horizontal and substantially circular trough extending longitudinally of said wall at the top of said vessel having an upwardly extending side wall with a substantially continuous top overflow edge positioned relative to said vessel wall so that milk overflowing said edge is filmed onto the full circular extent of the vessel wall for downward flow in heat transferring relation therewith above a body of the milk collecting in the bottom of the vessel, an inlet positioned to direct milk tangentially into the trough, and means within the vessel for agitating said body of milk.

4. A milk temperature conditioning vessel having an upwardly extending circular cross section side wall, means for passing fluid in heat transferring relation with said wall, a substantially horizontal and substantially circularly extending trough offset to the outside of the inner surface of said wall at the top of said vessel and having an upwardly extending side wall with a substantially continuous top overflow edge positioned relative to said wall so that milk overflowing said edge is filmed onto the full circular extent of said surface for downward flow in heat transferring relation therewith above a body of the milk collecting in the bottom of the vessel, and an inlet positioned to direct milk tangentially into the trough.

5. A milk temperature conditioning vessel having an upwardly extending circular cross section side wall comprising a smooth inside sheet metal liner, means at the outside of said liner for passing cooling fluid in heat transferring relation therewith, a substantially horizontal and substantially annular trough at the top of the vessel and having an upwardly extending side wall with a substantially continuous top overflow edge positioned relative to said wall so that milk overflowing said edge is filmed onto the full circular extent of said liner for downward flow in heat transferring relation therewith above a body of the milk collecting in the bottom of the vessel, and an inlet positioned to direct milk tangentially into the trough.

6. A milk temperature conditioning vessel having an upwardly extending circular cross section side wall comprising a smooth inside sheet metal liner, means at the outside of said liner for passing cooling fluid in heat transferring relation therewith, a substantially horizontal and substantially annular trough at the top of the vessel offset in said wall to the outside of said liner and having an upwardly extending side wall with a substantially continuous top overflow edge positioned relative to said wall so that milk overflowing said edge is filmed onto the full circular extent of said liner for downward flow in heat transferring relation therewith above a body of the milk collecting in the bottom of the vessel, and an inlet positioned to direct milk tangentially into the trough.

7. A milk temperature conditioning vessel having an upwardly extending circular cross section side wall comprising a smooth inside sheet metal liner, means at the outside of said liner for passing cooling fluid in heat transferring relation therewith, a substantially horizontal and substantially annular trough extending longitudinally of said wall at the top of the vessel offset in said wall to the outside of said liner and having an upwardly extending side wall with a substantially continuous top overflow edge positioned relative to said vessel wall so that milk overflowing said edge is filmed onto the full circular extent of said liner for downward flow in heat transferring relation therewith above a body of the milk collecting in the bottom of the vessel, the interior of the trough being openly accessible from the inside to permit thorough cleansing, and an inlet positioned to direct milk tangentially into the trough.

MERLE A. SODEN.

REFERENCES CITED

The following references are of record in the file of this patent:

UNITED STATES PATENTS

| Number | Name | Date |
| --- | --- | --- |
| 56,780 | Moore | July 21, 1866 |
| 903,029 | Tyson | Nov. 3, 1908 |
| 969,018 | Willmann | Aug. 30, 1910 |
| 983,561 | McPherson et al. | Feb. 7, 1911 |
| 1,178,562 | Weymouth et al. | Apr. 11, 1916 |
| 1,768,916 | Lancaster | July 1, 1930 |
| 1,797,014 | Nichols | Mar. 17, 1931 |
| 1,865,775 | Martocello, Sr. | July 5, 1932 |
| 2,006,299 | Kaestner | June 25, 1935 |
| 2,024,639 | Green | Dec. 17, 1935 |

FOREIGN PATENTS

| Number | Country | Date |
| --- | --- | --- |
| 20,087 | Great Britain | Aug. 17, 1895 |
| 51,564 | Germany | Apr. 17, 1890 |
| 581,805 | Germany | Nov. 17, 1933 |